United States Patent
Kurtz et al.

(10) Patent No.: US 6,330,829 B1
(45) Date of Patent: Dec. 18, 2001

(54) OIL-FILLED PRESSURE TRANSDUCER

(75) Inventors: Anthony D. Kurtz, Ridgewood; Robert Gardner, Westwood, both of NJ (US)

(73) Assignee: Kulite Semiconductor Products Inc.

( * ) Notice: Subject to any disclaimer, the term of this patent is extended or adjusted under 35 U.S.C. 154(b) by 0 days.

(21) Appl. No.: 09/526,940

(22) Filed: Mar. 16, 2000

(51) Int. Cl.[7] .................................................. G01L 9/00
(52) U.S. Cl. ............................................................. 73/717
(58) Field of Search ................................. 73/715, 716, 717, 73/719, 723, 725, 756; 338/2, 4, 42, 36, 226

(56) References Cited

U.S. PATENT DOCUMENTS

| | | |
|---|---|---|
| 5,286,671 | 2/1994 | Kurtz et al. . |
| 5,891,751 | 4/1999 | Kurtz et al. . |
| 5,955,771 | 9/1999 | Kurtz et al. . |
| 5,973,590 | 10/1999 | Kurtz et al. . |

*Primary Examiner*—William Oen
(74) *Attorney, Agent, or Firm*—Duane Morris; Arthur L. Plevy

(57) ABSTRACT

A differential pressure transducer comprising: a housing having a first end containing a first recess, and an oppositely disposed second end containing a second recess; first and second isolation diaphragms respectively enclosing said first and second recesses and forming in conjunction therewith first and second cavities; first and second headers secured within said housing and being electronically coupled together; and, a pressure sensor being adapted to withstand an excess in either said first or second pressures and secured to said first header so as to isolate said first and second cavities from one another and being responsive to a first pressure applied to said first diaphragm and a second pressure applied to said second diaphragm to produce at least one signal indicative of a difference between said first and second pressures.

17 Claims, 6 Drawing Sheets

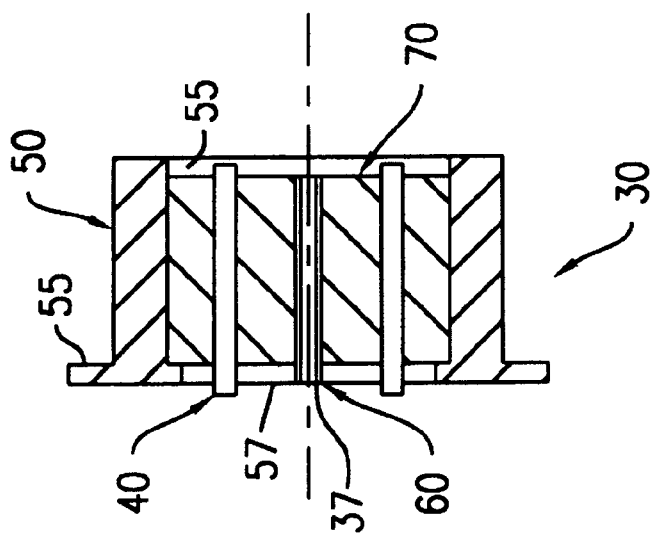
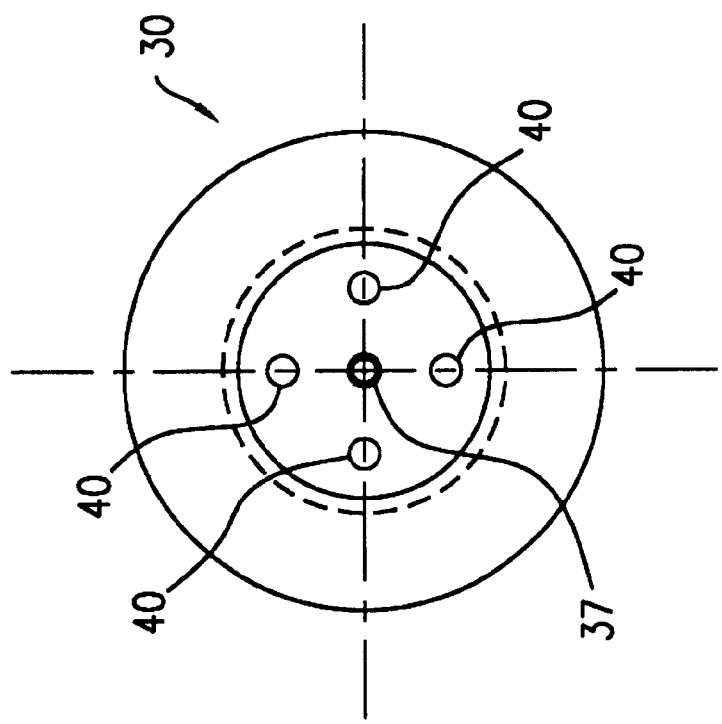

OIL-FILLED PRESSURE TRANSDUCER

FIELD OF INVENTION

The present invention relates to pressure sensing devices, and more particularly to an oil-filled pressure transducer adapted for use in hostile environments which subject the transducer to harsh resonances.

BACKGROUND OF INVENTION

Oil-filled transducers are well known in the art. It is also well known that resonances can occur within a pressure cavity and be transferred through an isolation diaphragm, through the oil-filled cavity to a sensor itself. In extreme conditions these resonances can exert significant stresses on gold wires bonded to the sensor chip sufficient to cause either ball bonds to fracture or the gold wire itself to fail. In addition, when the transducer is used to measure a differential pressure across a pump, large pressure pulses result when cavitation occurs in the pump, which can also cause similar results. In any event, for a variety of reasons severe pressure spikes may be transmitted through the oil of an oil-filled pressure transducer putting excess stress on gold wires of the sensor as well as generating excessive stresses in the sensor itself, undesirably resulting in premature failure of the sensor.

It is therefore an object of the present invention to render such excess stresses harmless to the sensor to insure its survivability under these adverse conditions.

SUMMARY OF INVENTION

A differential pressure transducer including: a housing having a first end containing a first recess, an oppositely disposed second end containing a second recess; first and second isolation diaphragms respectively enclosing said first and second recesses and forming in conjunction therewith first and second cavities; first and second headers secured within said housing and being electronically coupled together; and, a silicon sensor secured to said first header so as to isolate said first and second cavities from one another and being responsive to a first pressure applied to said first diaphragm and a second pressure applied to said second diaphragm to produce at least one signal indicative of a difference between said first and second pressures and being adapted to withstand an excess in either said first or second pressures.

BRIEF DESCRIPTION OF THE FIGURES

FIG. 3 illustrates an end-view of a first header utilized according to a preferred form of the invention.

FIG. 4 illustrates a cross-section of the header of FIG. 3.

DETAILED DESCRIPTION OF INVENTION

The basic approach according to the present invention includes using a specially designed "leadless" sensor chip having "through" apertures such that a separate pressure can be applied to each side of the chip, the chip itself being mounted on a specially designed header. By being secured to the specially designed header, the chip is more robust and less likely to be damaged by severe stresses caused by pump cavitation for example. The sensor chip can be either an open or closed bridge. The dieletrically isolated sensor chip can be manufactured in accordance with the teachings of commonly assigned U.S. Pat. No. 5,955,771 entitled "SENSORS FOR USE IN HIGH VIBRATIONAL APPLICATIONS AND METHODS FOR FABRICATING SAME" issued Sep. 21, 1999 and commonly assigned U.S. Pat. No. 5,973,590 entitled "ULTRA THIN SURFACE MOUNT WAFER SENSOR STRUCTURES AND METHODS FOR FABRICATING SAME" issued Oct. 26, 1999, the entire disclosures of which are hereby incorporated as if being set forth in their respective entireties. Therein, a P+ region is bonded to an oxide layer on top of a silicon carrier wafer in accordance with the "diffusion enhanced bonding" technique as taught in commonly assigned U.S. Pat. No. 5,286,671, entitled "FUSION BONDING TECHNIQUE FOR USE IN FABRICATING SEMICONDUCTOR DEVICES" issued Feb. 15, 1994, the entire disclosure of which is also incorporated by reference herein as if being set forth in its entirety.

The P+ fingers are sealed to a glass wafer containing apertures suitable for filling with a metal-glass frit, the purpose of which is to make electrical contact with to the contact fingers of the Wheatstone bridge. In addition, there is provided at least one additional aperture in the glass wafer which access the active portion of the sensor such that pressure applied through this central aperture will cause the sensor to deflect. Around the central aperture is a shallow depression substantially equal in size to the deflecting portion of the sensor, the depth of the depression being sufficient enough to permit deflection of the active portion of the sensor but shallow enough to act as an overpressure stop.

To the inactive side of the sensor diaphragm is sealed a second glass wafer which includes at least one aperture being aligned with the deflecting portion for the sensor. Around this aperture is also provided a small shallow depression approximately the size of the deflecting portion of the sensor and also deep enough to permit deflection of the active portion of the sensor yet shallow enough to act as an overpressure stop.

Figure 1:
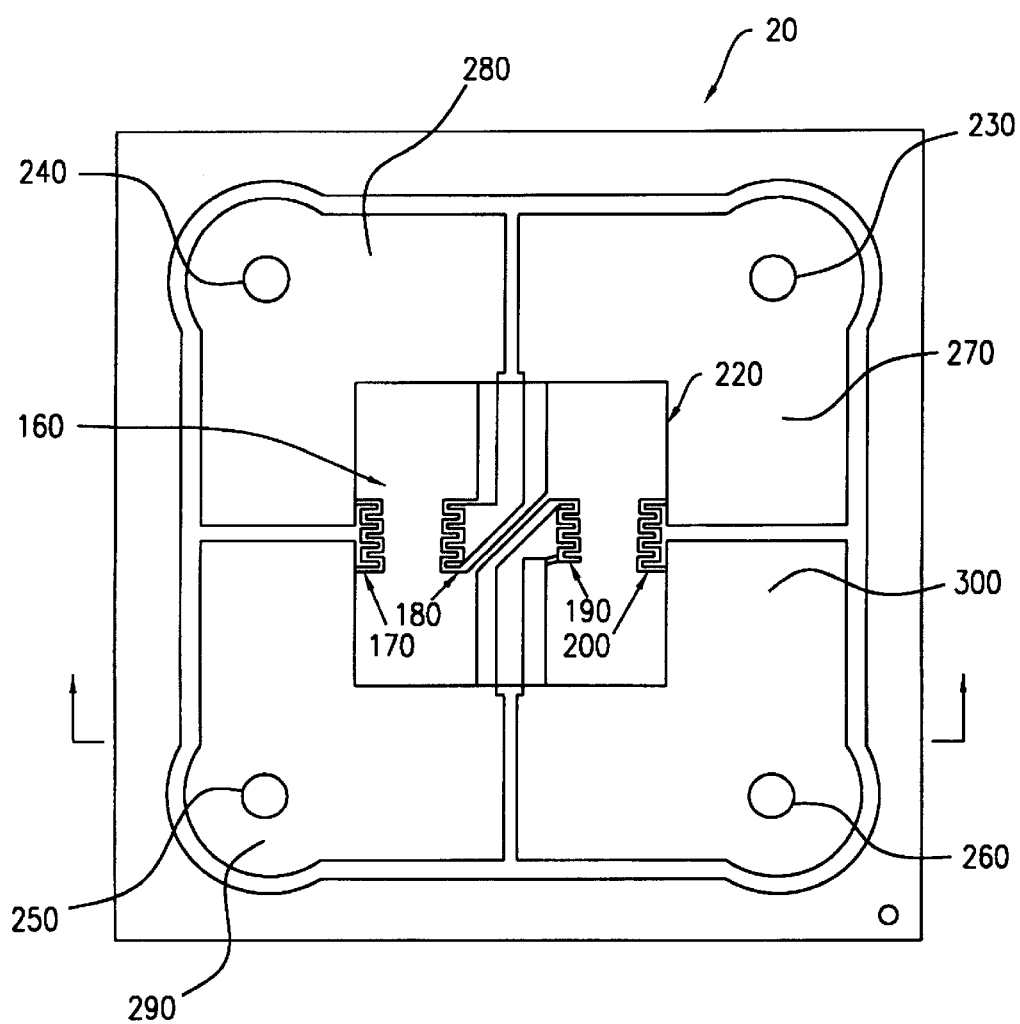
FIG. 1 illustrates a plan-view of a sensor structure according to a preferred form of the invention.
Figure 2:
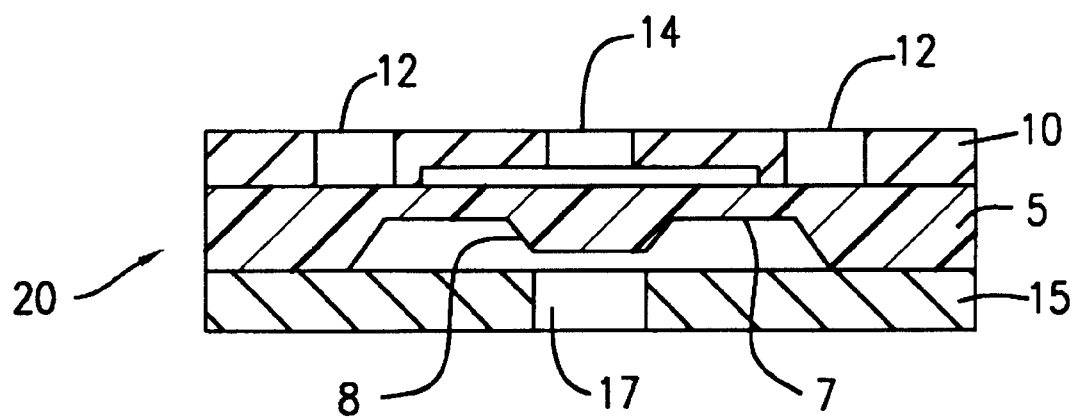
FIG. 2 illustrates a cross-section of the sensor of FIG. 1.

Referring now to the figures, like references identify like elements of the invention. A plan view of a circuit structure 160 of a sensor chip 20 preferably utilized according to the present invention is shown in FIG. 1 and a cross section is shown in FIG. 2. Such a sensor structure 160 is described in commonly assigned United States Patent No. 5,891,751, entitled "HERMETICALLY SEALED TRANSDUCERS AND METHODS FOR PRODUCING THE SAME", issued Apr. 6, 1999, the entire disclosure of which is also incorporated by reference as if being set forth in its entirety herein. While the particularly illustrated sensor structure 160 is well suited for the preferred embodiment of the present invention, other suitable circuit structures could of course be utilized.

In the preferred form, the circuit structure 160 takes the form of a piezoresistive bridge structure. This pressure sensitive structure 160 is of the type having serpentine or tortuous piezoresistors 170, 180, 190, 200 composed of highly doped P+ silicon. Each piezoresistor 170 180, 190, 200 is essentially a variable resistor in one of four legs of a Wheatstone bridge circuit with each of the respective resistances varying in response to an applied force or pressure to the sensor 20. Referring also to FIG. 2, the portion 220 of the bridge structure 160 is generally referred to as the "active" area of the sensor 20 as it overlays a thinner region of the wafer 5, e.g. a sensor diaphragm 8, that deflects upon the application of a pressure to the sensor 20. The areas of the sensor 20 that are external to the active area 220, e.g. around the periphery of the wafer 5, are termed the "non-active" areas.

Referring still to FIG. 1, for a closed bridge the four circuit nodes of the Be Wheatstone bridge consist of electrical contacts 230, 240, 250, 260, and are located in the non-active areas of the transducer. For an open bridge separate contact areas can be provided for each arm of the Wheatstone bridge as will be understood by those possessing ordinary skill in the pertinent art. Interconnecting the contacts 230, 240, 250, 260 with the piezoresistors 170, 180, 190, 200 are electrical interconnections or "fingers" 270, 280, 290, 300 which are also formed of P+ silicon. It is noted that the contacts 230, 240, 250, 260 being doped P+ are conductive, as are the interconnections 270, 280, 290, 300 to allow ohmic contact between the piezoresistive Wheatstone bridge comprised of piezoresistors 170, 180, 190, 200 and the contacts 230, 240, 250, 260. It should be understood, while the terms "electrical contacts", "interconnections" and "fingers" are used for convenience, these terms can each be considered to essentially be the electrical paths that electrically couple the piezoresistor elements 170, 180, 190, 200 with the contact areas 230, 240, 250, 260. The interconnections 270, 280, 290, 300 are wider than the piezoresistors 170, 180, 190, 200 to provide a low resistance path to the contacts 230, 240, 250, 260, while the long, tortuous lengths and narrow widths of the piezoresistors 170, 180, 190, 200 are designed to provide the desired resistances.

Referring again to FIG. 2, the wafer 5 includes a thinned portion which defines the active area 220 and deflectable sensor diaphragm 8 as has been described. The diaphragm 8 defines a recessed area 7 within the wafer 5 which is aligned with the active area 220 of the sensor 20. The recessed area 7 is preferably deep enough to permit adequate deflection of the diaphragm 8 for sensing purposes, yet shallow enough to act as an over-pressure stop. Likewise a small cavity or recess is preferably formed in the member 10 around the aperture 14 to enable the diaphragm 8 to deflect, yet shallow enough to serve as an over-pressure stop.

Still referring to FIG. 2, the side of the wafer 5 having the structure 160 formed thereon, opposite to the recess 7, is referred to herein as the "active" side, while the oppositely disposed side is referred to as the "inactive" side for purposes of explanation. To the inactive side of the wafer 5 is sealed a glass wafer or covering member 15 which includes an aperture 17 with is preferably central to the deflecting portion of the diaphragm 8, e.g. active area 220, and hence accesses the recess 7. When coupled to the wafer 5, the aperture 17 is surrounded by the small, shallow depression or recess 7 preferably equal in size to deflecting diaphragm 8 which forms the active area 220, the depth of the depression 7 being great enough to allow the sensor diaphragm 8, e.g. active area 220, to deflect but shallow enough to allow the member 15 to act as an over-pressure stop.

Still referring to FIG. 2, a second covering or glass member 10 is preferably sealed to the P+ fingers 260, 270, 280, 290 formed on the active side of the wafer 5. The glass member 10 includes apertures 12 suitable for filling with a metal-glass frit, the purpose of which is to respectively make electrical contact with the contact areas 230, 240, 250, 260 of the structure 160. In addition, there is provided at least one additional aperture 14 in the glass wafer 10 which accesses the diaphragm 8 of the sensor 20. A pressure applied through this aperture 14 will cause the sensor diaphragm 8 of the sensor 20, e.g. the active area 220, to deflect. The wafer 5 is preferably composed of silicon while the covering members 10 and 15 are preferably composed of a suitable glass.

In FIG. 3 is illustrated an end view of a first header 30 preferably used in connection with the sensor 20. For a closed bridge, the header has four pins 40 (two input and two output); while for an open bridge it has 5 to 6 pins 40 (to provide individual connectivity for each of the Wheatstone bridge arms). In addition, the header 30 includes an aperture 37. To mount the sensor 20 to the 20 header 30, apertures 12 in the glass member 10, which is bonded to the active side of the sensor 20, are filled with a conductive metal-glass frit and subsequently affixed to the pins 10 of the header 30 such that the aperture 14 of the glass member 10 is aligned with the central aperture 37 of the header 30.

Referring now also to FIG. 4, there is illustrated a cross-section of the header 30 of FIG. 3. The header 30 preferably includes a cylindrical main body 50 having a glass portion 70 affixed therein so as to leave recessed portions 55 and 57 in each longitudinal end of the body 50. The glass portion 70 serves to electrically insulate each of the pins 40 from one another as well as from the body 50. Preferably a Kovar tube 60 is affixed within the aperture 37 which also passes through the glass portion 70. The pins 40 each preferably extend into the recessed portions 55, 57 to enable electrical connectivity between the oppositely disposed longitudinal ends of cylindrical body 50. However, each of the pins 40 further preferably protrudes out of and hence completely through the recessed portion 57 and one end of the body 50. The pins 40 of the header 30 which extend into the recessed portion 57 are preferably very short, e.g. on the order of 0.005 to 0.015 inches. Further, the recessed portion 55 is preferably formed so as to have suitable dimensions to at least partially accommodate the sensor 20 therein.

The header 30 further preferably includes an external flange 55 adjacent to the recessed portion 57 and of sufficient shape and thickness to make it suitable to be discharge welded to the body 90 of a transducer 100.

Figure 5:
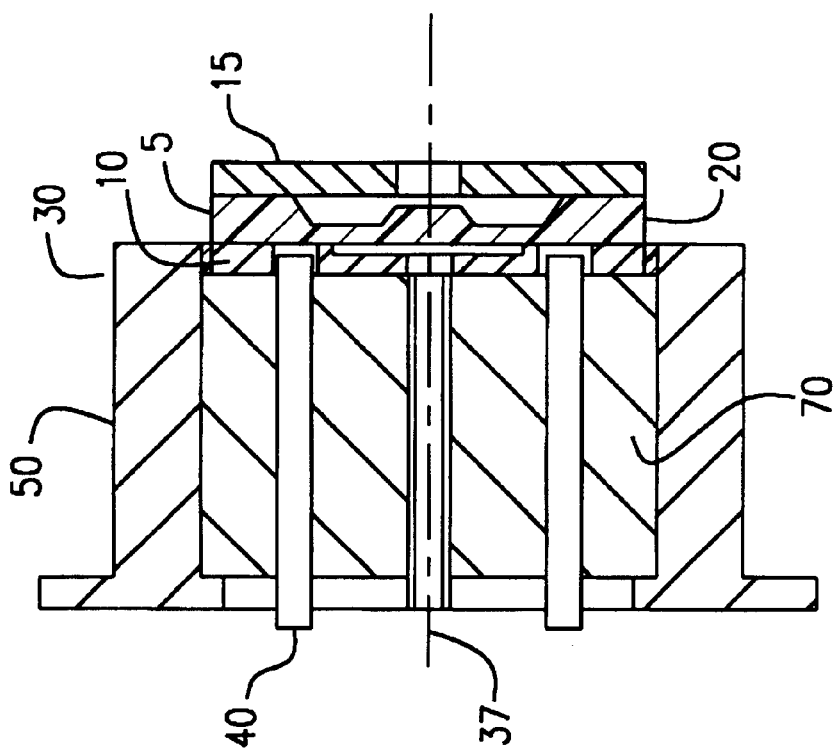
FIG. 5 illustrates a cross-section of the sensor of FIG. 1 attached to the header of FIG. 3.
Figure 7:
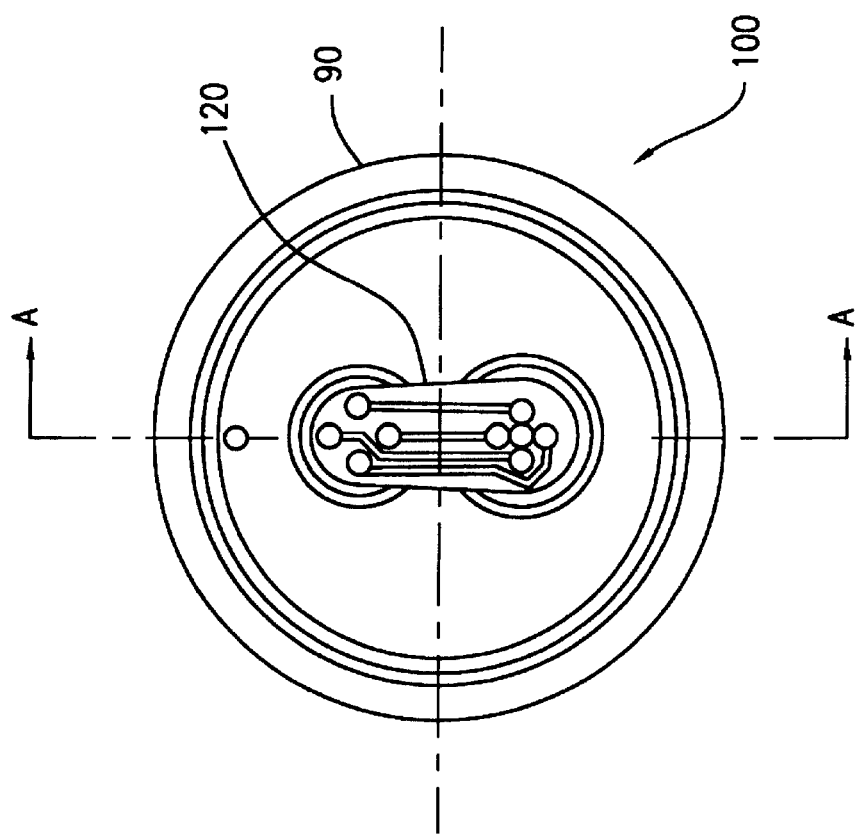
FIG. 7 illustrates an end-view of the device of FIG. 6.

The header 30 with the sensor chip 20 mounted thereon is shown in FIG. 5. Basically, the sensor chip 20 is at least partially accommodated in the recess 55 of the body 50 of the header 30 such that pins 40 are in electrical contact with the metal-glass frits in the apertures 12 which are in electrical contact with the contact areas 230, 240, 250, 260. Accordingly, a pressure can be communicated through the apertures 37 and 14 to the active area 220 of the sensor 20 and electrical signals indicative of an amount of deflection of the diaphragm 8 can be sensed using the pins 40.

Figure 6:
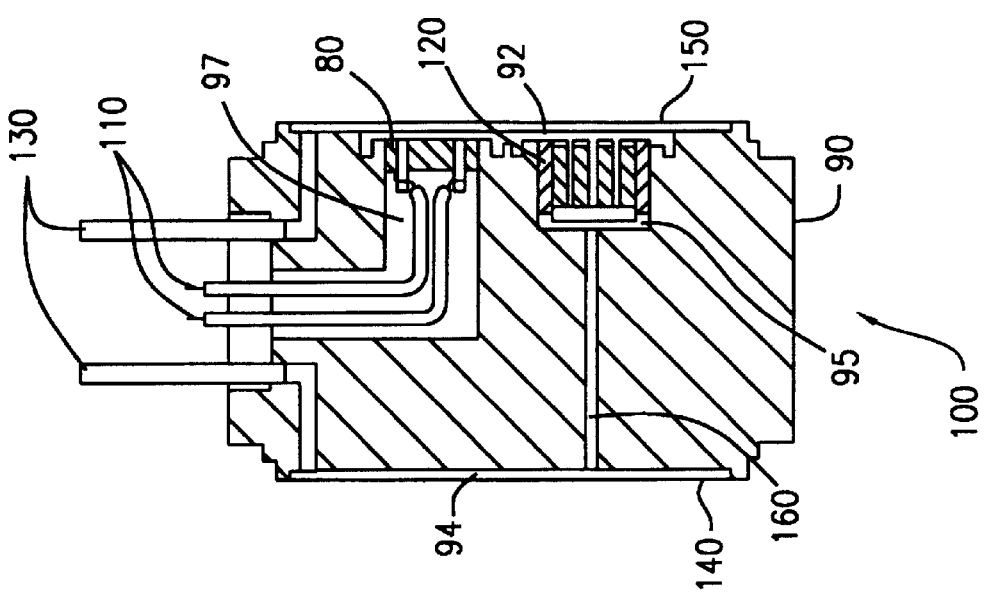
FIG. 6 illustrates a cross-section of a pressure transducer according to a preferred form of the invention.
Figure 8:
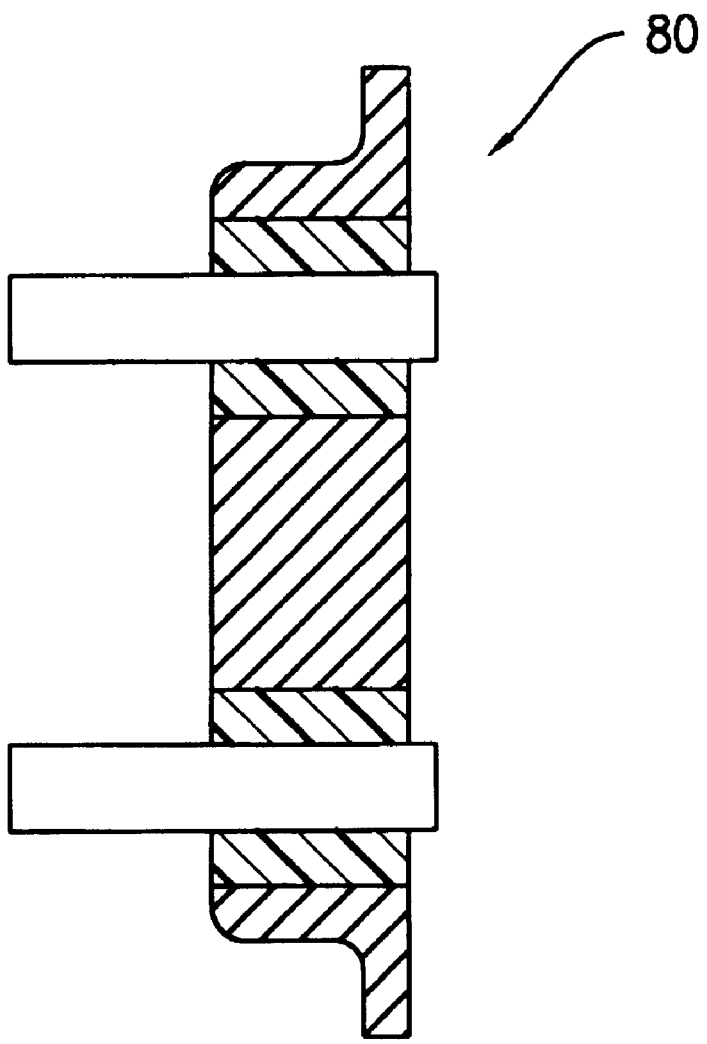
FIG. 8 illustrates an enlarged cross-section of the second header 80 of FIG. 6.

As is shown in FIG. 6, the assembly of FIG. 5 including the sensor chip 20 and header 30 is welded or otherwise suitably affixed within a recess 95 of a body 90 of a transducer 100. The flange 55 is preferably used to suitably seat the header 30 within a recessed area 95 of the body 90 of the transducer 100. A second header 80 is also welded within a recess 97 of the body 90 of the transducer 100. The second header 80 preferably includes external leads 110 which access the exterior of the transducer body 90. A flexible circuit 120 is preferably used to electrically interconnect the two headers 30, 80. The flexible circuit 120 can readily be made to electrically contact the portions of the pins 40 which extend through the recess 57 of the body 50 of the header 30 using conventional methodology.

The transducer body 90 preferably takes the form of a cylindrical body having recesses 92, 94 in each end. Isolation diaphragms 140, 150 are preferably affixed over each recess 92, 94 thereby forming cavities which are preferably oil-filled. There is further included channel 160 through the transducer body 90 which opens to both recess 94 and recess 95 which in turn opens to recess 92. Oil-fill tubes 130 access the cavities formed by the diaphragms 140, 150 and recesses 94, 92 and are positioned so as to extend out a side-wall of the body 90 of the transducer 100. The tubes 130 can be used to fill the recesses 94, 92 with a suitably non-compressible oil and hence the channel 160, recess 95, and apertures 37, 14 and 17 as well. The lead wires 110 also preferably extend out the same sidewall substantially adjacently to the oil-fill tubes 130 according to the preferred form of the present invention.

Accordingly, a positive pressure applied to the isolation diaphragm 140 will be communicated through the oil-filled recess 94 and channel 160 through the aperture 37 and aperture 14 and will cause the diaphragm 8, and hence active area 220 of the sensor 20 to deflect. Further, a positive pressure applied to the isolation diaphragm 150 will be communicated through the oil-filled recess 92 aperture 17 and will cause the diaphragm 8 and hence active area 220 of the sensor 20 to deflect in an opposite direction.

When the two headers 30, 80 are welded to the transducer body 90, the cavities formed by the diaphragms 140, 150 are isolated from one-another by the sensor chip 20. Thus, when a positive pressure is exerted on the first isolation diaphragm 140, it will cause a deflection of the sensor active area 220 because of the pressure difference between the two oil cavities. Similarly, when a positive pressure is exerted on the second isolation diaphragm 150, it will cause a deflection of the same area 220 but in the opposite direction, and when equal pressures are exerted on both isolation diaphragms 140, 150 no deflection will result. Thus, the deflection of the active area 220 is caused by the difference in pressure applied to the two isolation diaphragms 140, 150.

It should also be noted that the short pins 40 on both headers 30, 80 and the flex circuit 120 insures that the oil-filled cavity formed by the diaphragm 150 has a minimal oil volume, resulting in better thermal performance.

Although the invention has been described and pictured in a preferred form with a certain degree of particularity, it is understood that the present disclosure of the preferred form, has been made only by way of example, and that numerous changes in the details of construction and combination and arrangement of parts may be made without departing from the spirit and scope of the invention as hereinafter claimed. It is intended that the patent shall cover by suitable expression in the appended claim, whatever features of patentable novelty exist in the invention disclosed.

We claim:

1. An oil-filled differential pressure transducer comprising:
    a housing including a first end containing a first recess, an oppositely disposed second end containing a second recess, and first and second isolation diaphragms respectively enclosing said first and second recesses and forming in conjunction therewith first and second oil-filled cavities;
    first and second headers secured within said housing and being electrically coupled together, said first header including a plurality of pins and a central aperture opening there through; and,
    a dielectrically isolated, lead-less sensor mounted to said first header, said sensor including:
        a sculptured silicon wafer including first and second surfaces and a deflectable diaphragm;
        a P+ region formed on said first surface of said silicon wafer and including a plurality of serpentine resistors formed into a Wheatstone Bridge on the deflectable diaphragm, a group of large contact areas leading from the Wheatstone Bridge, and a rim surrounding and electrically isolated from the contact areas; and,
        a first glass wafer sealed to at least part of said P+ region, said first glass wafer including a central channel and a plurality of apertures opening there through, each of said apertures being filled with a glass-metal frit adapted to make electrical contact to an associated one of said contact areas and a corresponding one of said pins of said first header;
    whereby, a first pressure applied to said first diaphragm is communicated to said sensor through said first oil-filled cavity, central aperture of said first header and central channel of said first glass wafer, and a second pressure applied to said second diaphragm is communicated to said sensor through said second oil-filled cavity, such that said first and second pressures are applied to opposite sides of the sensor, and a resulting deflection of said diaphragm is indicative of a difference between said first and second pressures.

2. The transducer of claim 1, wherein said first glass further includes a depression substantially equal in size to the deflecting portion of the sensor surrounding said central channel, a depth of the depression being great enough to permit deflection of the sensor diaphragm but shallow enough to act as an over-pressure stop for said sensor diaphragm.

3. The transducer of claim 2, further comprising a second glass wafer sealed to said silicon wafer, said second glass wafer including a depression substantially equal in size to the deflecting portion of the sensor surrounding said central channel, a depth of the depression being great enough to permit deflection of the sensor diaphragm but shallow enough to act as an over-pressure stop for said sensor diaphragm.

4. The transducer of claim 3, further comprising a flexible circuit electrically coupling said first header to said second header, wherein said first header includes a first header housing having first and second longitudinal ends, a glass portion secured within said first header housing so as to form a first recess in said first end, and a plurality of electrically conductive pins traversing from said first recess, through said glass portion and out said second end, wherein when said sensor is secured to said first header, said pins contact and provide electrical interconnectivity between said Wheatstone bridge circuit and said flexible circuit.

5. The device of claim 4, wherein said first and second cavities are filled with a suitably non-compressible oil.

6. The device of claim 1, further comprising a channel through said housing opening between said first and second oil-filled cavities, wherein said first header and sensor isolate said channel from said second oil-filled cavity.

7. An improved wet-to-wet differential pressure sensing device comprising a housing including a first pressure receiving port and a second pressure receiving port, a first isolation diaphragm secured within said housing and forming in combination therewith a first cavity, a second isolation diaphragm secured within said housing and forming in combination therewith a second cavity, said improvement comprising:
    a first header secured within said housing so as to be interposed between said first and second cavities, said first header including at least one aperture passing there through and a plurality of pins;

a doubly stopped dielectrically isolated pressure sensor to which is affixed a glass member with a group of apertures being congruent with electrical contact areas of the pressure sensor and filled with a glass-metal frit adapted to make electrical contact between the contact areas of the sensor and the pins of the header, wherein when said sensor is secured to said first header, said first header and sensor serve to isolate said first cavity and aperture from said second cavity; and, a second header secured within said housing and electrically coupled to said first header.

8. The device of claim 7, wherein said first and second cavities are filled with a suitably non-compressible oil.

9. The device of claim 8, wherein said sensor comprises a first wafer having a deflectable diaphragm portion and a Wheatstone bridge piezoresistive circuit formed on said deflectable diaphragm.

10. The device of claim 9, wherein said first wafer includes first and second sides and said sensor further comprises a first covering member secured to a first side of said first wafer and a second covering member secured to said second side of said first wafer.

11. The device of claim 10, wherein said first covering member includes a plurality of apertures passing there through and said second covering member includes at least one aperture passing there first and second covering members further serve as over-pressure stops for said deflectable diaphragm.

12. The device of claim 11, further comprising a flexible circuit electrically coupling said first header to said second header, wherein said first header includes a first header housing having first and second longitudinal ends, a glass portion secured within said first header housing so as to form a first recess in said first end, and a plurality of electrically conductive pins traversing from said first recess, through said glass portion and out said second end, wherein when said sensor is secured to said first header, said pins contact and provide electrical interconnectivity between said Wheatstone bridge circuit and said flexible circuit.

13. A device for providing a signal indicative of a difference in two pressures comprising:

a substantially cylindrical housing including first and second longitudinal ends and first and second recessed respectively formed in said first and second ends of said housing;

a first diaphragm covering said first recess and a second diaphragm covering said second recess, said first and second diaphragms being adapted to respectively receive first and second pressures;

a first header having at least one channel passing there through and being secured within said housing between said first and second recesses;

a pressure sensitive electronic device including a deflectable diaphragm and being adapted to provide a signal indicative of an amount of deflection of said diaphragm, said electronic device being secured to said first header so as to isolate said first recess from said second recess; and, a second header secured within said housing and electronically coupled to said first header.

14. The device of claim 13, further comprising a plurality of electrical wires coupled to said second header.

15. The transducer of claim 14, wherein said pressure sensitive electronic device includes a first wafer having first and second sides and a recessed portion defining a deflectable diaphragm defining an active region surrounded by an inactive region, a first covering member secured to a first side of said first wafer and a second covering member secured to said second side of said first wafer.

16. The transducer of claim 15, wherein said first covering member includes a plurality of apertures passing there through and said second covering member includes at least one aperture passing there through and said first and second covering members further serve as over-pressure stops for said deflectable diaphragm.

17. The device of claim 16, wherein at least one of said apertures in said first second wafer opens to said diaphragm and said first recess, at least one other of said plurality of said apertures in said second wafer are filled with a conductive material, and said aperture in said third wafer opens to said diaphragm and said second recess.

\* \* \* \* \*